US007293546B1

(12) United States Patent
Confer et al.

(10) Patent No.: US 7,293,546 B1
(45) Date of Patent: Nov. 13, 2007

(54) CHARGE MOTION CONTROL DEVICE USING A SINGLE COMMON DRIVE SHAFT

(75) Inventors: Keith A. Confer, Flushing, MI (US); Ian R. Jermy, LeRoy, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/429,883

(22) Filed: May 8, 2006

(51) Int. Cl.
*F02B 31/00* (2006.01)
*F02M 35/10* (2006.01)
(52) U.S. Cl. .................. 123/308; 123/337; 123/184.55
(58) Field of Classification Search ................ 123/308, 123/302, 306, 432, 336, 337, 184.55, 184.21, 123/184.61
See application file for complete search history.

(56) References Cited

U.S. PATENT DOCUMENTS

| 5,590,628 | A  | * | 1/1997  | Patyi et al. ............ 123/184.55 |
| 6,155,229 | A  |   | 12/2000 | Cantrell, Jr. et al. |
| 6,394,066 | B1 |   | 5/2002  | Chou et al. |
| 6,712,038 | B2 |   | 3/2004  | Hiraku et al. |
| 6,772,729 | B2 | * | 8/2004  | Brosseau et al. ........... 123/308 |
| 6,827,060 | B2 |   | 12/2004 | Huh |

* cited by examiner

*Primary Examiner*—Hieu T. Vo
(74) *Attorney, Agent, or Firm*—Paul L. Marshall

(57) ABSTRACT

An apparatus and method for controlling a plurality of charge motion control devices in the air intake manifold. In a first aspect of the invention, the valves are controlled through a single common drive shaft. In a second aspect, the runners each include an air flow bypass positioned between the valve and the cylinder head mounting end of the runner such that the valve is positioned further away from the combustion chamber.

17 Claims, 2 Drawing Sheets

CHARGE MOTION CONTROL DEVICE USING A SINGLE COMMON DRIVE SHAFT

TECHNICAL FIELD

The present invention relates to flow control devices and methods in an internal combustion engine, and more particularly relates to a charge motion control device and method for improved control of air flow through the intake manifold of the engine.

BACKGROUND OF THE INVENTION

It is generally known in the art of internal combustion engine design to use charge motion control valves in an intake manifold. The "charge" is understood to mean the air-fuel mixture being delivered to the combustion chamber. "Charge motion" is a purposely induced, preferential movement of the charge for more efficient burning in the combustion chamber. There are basically two main types of induced charge motion: tumble and swirl. "Tumble" is understood to mean air turbulence about an axis perpendicular to the longitudinal axis of the cylinder. "Swirl" is air turbulence rotating about an axis generally parallel to the cylinder axis. Today's prevalent method for inducing tumble and/or swirl in an engine is through the use of valves that are configured to preferentially direct air flow through the intake runners and/or combustion chamber. The valves may be programmed to work during certain selected engine conditions to improve the homogeneity of the charge which will thus burn more effectively. For example, tumble is particularly desirable and effective during the first 20 seconds of a cold engine start and also at light engine load conditions (e.g., less than about 3,000 rpm).

Prior art tumble control valves generally comprise a valve body having an internal cavity and a valve flap or blade pivotally disposed within the internal cavity of the valve body. The valve blade pivots between fully open and fully closed positions. When in the fully closed position, the blade lies substantially perpendicular to the longitudinal axis of the valve body. In this position, the bottom edge of the blade lies in close relationship to the bottom wall of the internal cavity, thus effectively sealing off this area to air flow. Conversely, the top edge of the blade lies in spaced relation to the top wall of the internal cavity to define a gap wherethrough air may flow. Thus, in the fully closed position of the valve blade, maximum tumble is generated since the air flow is forced to pass through the gap defined along the top wall of the internal cavity of the valve body. When engine conditions indicate tumble or swirl are not needed, the valve opens to allow air flow through the runner in the normal manner.

The charge motion control valves are typically positioned in each air intake runner in close proximity to the inlet to the engine head port and intake valve. If the valves are located at too great a distance, the tumble or swirl effect is reduced or eliminated before the air intake charge enters the combustion chamber. In some applications, a shelf or flow divider is placed in the runner, just downstream of the charge motion valve, to extend the biased flow closer to the intake valve in the head. Because of the need to have the charge motion control valves close to the intake valve in the head, V6 and V8 applications of tumble and swirl control require two sets of valves, one set for the right bank and one set for the left bank of the engine.

A common actuator is usually employed to drive both sets of motion control valves. An exposed linkage extends from either side of the actuator to drive each of the two sets of valves. This linkage arrangement between the two sets of valves has drawbacks such as wear and breakage of the linkage parts, the added parts cost and space requirements within the engine compartment, for example. Although two shafts and associated linkages to the actuator are not required in a straight, in-line engine, the fact that the tumble control valves must be placed close to the cylinder heads places limitations on engine and manifold design and creates possible valve failure due to the high heat environment in the vicinity of the combustion chambers. It would therefore be desirable to have a design and method for controlling motion control valves of an engine which do not have the above-mentioned drawbacks of present day motion control valve drive arrangements.

SUMMARY OF THE INVENTION

The present invention successfully addresses the shortcomings of the prior art by providing in a first aspect of the invention a charge motion control device and method that utilizes a common drive shaft to drive both the right and left bank set of charge motion valves. In another aspect of the invention, a runner close-off valve is positioned in the runner with a runner bypass wherethrough air is directed when the valve is closed. Since the runner bypass induces the desired motion close to the cylinder head, the valve can be positioned further away from the high temperature environment of the combustion chamber. Although detailed description of the preferred embodiment herein will be directed to a V-type engine, it is understood that the invention is useful in both in-line and V-type engine designs.

The air intake manifold delivers air through individual runners, one for each cylinder head of the engine. Thus, in a V-6 engine for example, six individual runners extend to deliver air to the six cylinders of the engine, respectively. In the upper part of the manifold, the runners are arranged in linear fashion. At the lower part of the manifold, one half of the runners (three in the V-6 example) branch to the right bank of cylinder heads while the other half of runners branch to the left bank of cylinder heads of the engine. Since the charge motion control valves are positioned in the runners prior to the point where they branch off to the right and left cylinder banks, the valves may be controlled through a common drive shaft which greatly improves the overall manifold design as discussed above.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
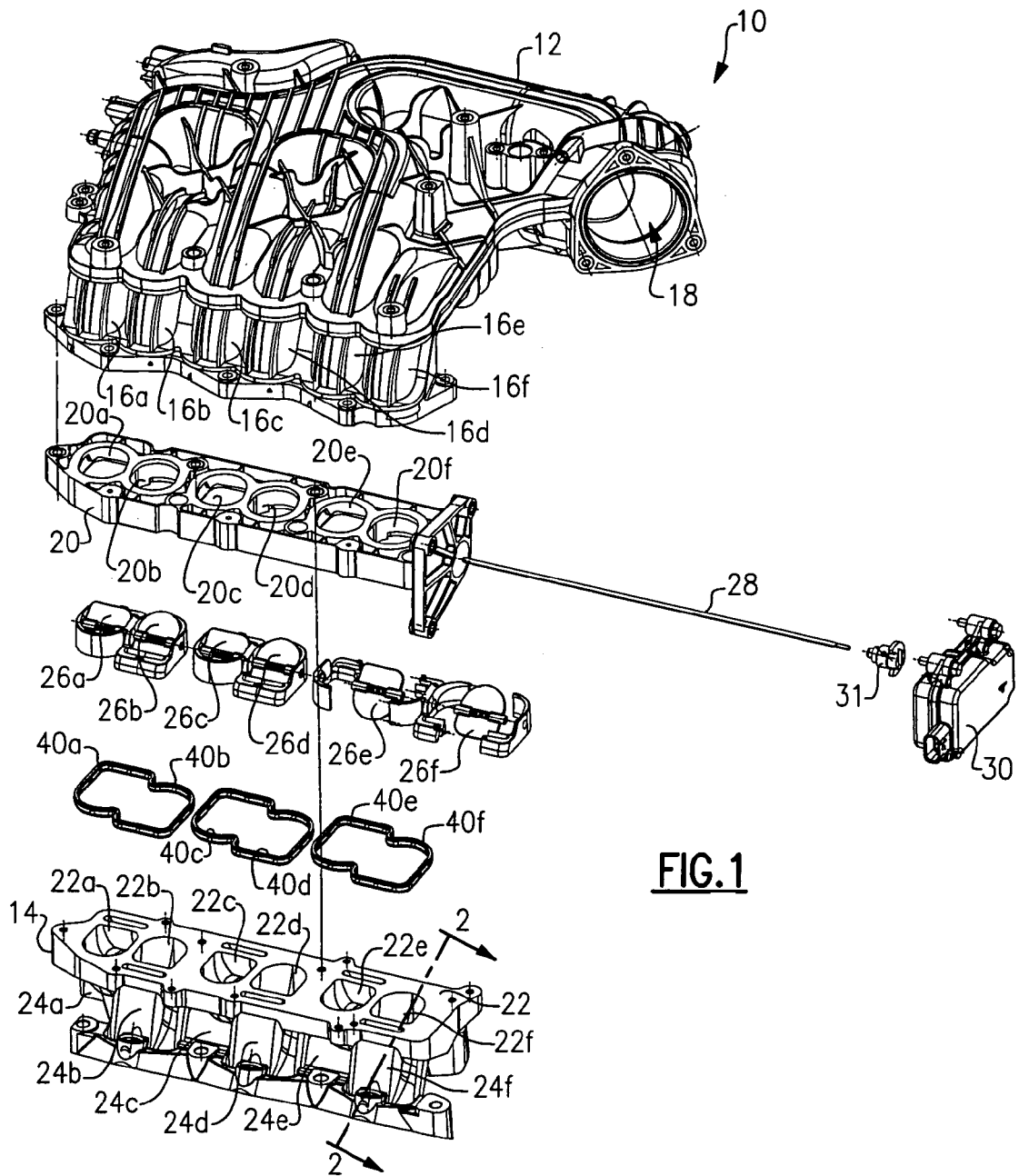
FIG. 1 is an exploded isometric view of an air intake manifold in accordance with an embodiment of the invention.
Figure 2:
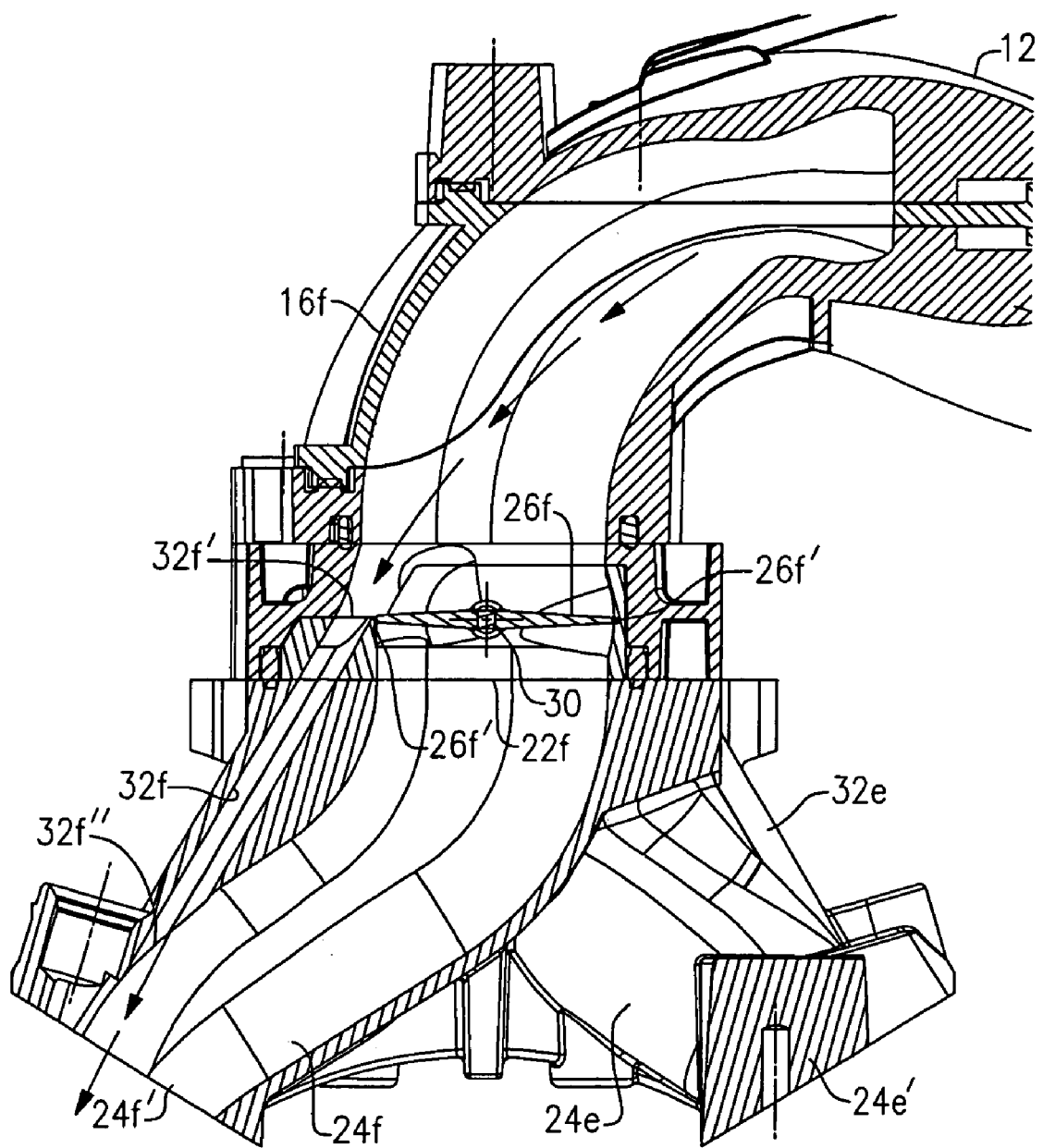
FIG. 2 is a cross-sectional view as taken generally along the line 2-2 in FIG. 1, in the assembled condition.

Referring now to the drawings, there is seen in FIGS. 1 and 2 a preferred embodiment of the inventive charge motion control device incorporated into an air intake manifold assembly designated generally by the reference numeral 10. It is understood that intake manifold assembly 10 is provided for purpose of description only and the invention is not limited to the particular manifold design shown in the figures. Rather, the invention is applicable to any manifold design which could benefit from the advantages the present invention offers as further explained below.

Referring to FIG. 1, an air intake manifold having a first or upper manifold portion 12 and a second or lower manifold portion 14 is provided to deliver air to the combustion chambers of an internal combustion engine (not shown). In the illustrated embodiment, the upper manifold 12 includes six upper manifold runners 16a-16f although the number of runners in the particular manifold design being employed will vary depending on the number of engine cylinders for which the manifold is designed. The upper manifold runners 16a-16f extend and receive air from a main air intake port 18.

A valve flange 20 having six runner openings 20a-20f is mounted to upper manifold 12 with the valve flange runner openings 20a-20f in registration with upper manifold runners 16a-16f, respectively. While valve flange 20 is shown as a separate part, it may be formed integral with upper or lower manifold 12, 14 as desired.

Lower manifold 14 includes an upper mounting plate 22 having six runner openings 22a-22f formed therein. During assembly of the upper and lower manifold portions 12 and 14, lower manifold runner openings 22a-22f are placed in registration with valve plate openings 20a-20f, and thus also upper runners 16a-16f, respectively. Each respective set of openings 16a-16f, 20a-20f, and 22a-22f is arranged in linear fashion.

At lower manifold portion 14, runner openings 22a-22f extend into respective lower manifold runners 24a-24f which branch off in opposite, non-linear fashion so that three outlet ends 24b', 24d' and 24f' thereof may be aligned with and mounted in registration with the left bank of cylinder heads of a V-6 engine (not shown) while the other three outlet ends 24a', 24c' and 24e' thereof may be aligned with and mounted in registration with the right bank of cylinder heads. In the preferred embodiment, lower manifold runners 24a-24f alternately branch away in different directions although this may vary as desired. As stated above, a V-6 engine application is only an exemplary embodiment of the invention and the particular number and arrangement of runners will depend on the engine for which the manifold is designed.

Six charge motion control valves 26a-26f which optionally include respective seals 40a-40f are positioned at or near lower manifold runner openings 22a-22f, respectively. Since lower manifold openings 22a-22f are arranged in linear fashion as described above, motion control valves 26a-26f are likewise arranged in linear fashion. As such, a single drive shaft 28 may extend through and control movement of all six valves 26a-26f. Drive shaft 28 is driven by a single actuator 30 via coupling 31 with no linkages being required as in the prior art where two separate drive shafts, one for each cylinder bank, are required and driven by a common actuator as explained above. Although the preferred embodiment herein described and shown does not include linkages between the actuator and drive shaft, it is possible that a simple linkage may be required if the actuator must be placed offset from the drive shaft. Such offsetting of the actuator with respect to the drive shaft may be necessary in some engine compartment designs.

As stated above, lower manifold 14 openings 22a-22f are arranged in linear fashion with lower manifold runners 24a-24f alternately branching in opposite direction to align with the right and left backs of cylinder heads. Thus, lower manifold 14 openings 22a-22f feed both the right and left banks of the cylinder heads. Since the motion control valves 26a-26f are placed at the linearly arranged openings 22a-22f, they also are arranged in linear fashion allowing them to be driven by a single drive shaft 28.

Two of the alternately branching lower manifold runners are seen best in the cross-sectional view of FIG. 2. In FIG. 2, it is seen that lower manifold runners 24e and 24f each include a respective runner bypass 32e and 32f. While description of the bypass runners herein relate particularly to runner 24f, it is understood that each lower manifold runner 24a-24f has such a runner bypass.

The upper inlet end of each runner bypass 32f is positioned radially outwardly of the peripheral edge 26f' of the respective motion control valve blade 26f when the valve 26f is in the closed position as seen in FIG. 2. When the valve is in this closed position, it extends in a plane substantially perpendicular to its respective runner (valve 26f and respective runner 22f seen in FIG. 2) and thus blocks airflow through the corresponding lower manifold runner 24f. Hence, air is diverted through the respective bypass 32f which is outboard of and thus not blocked by the closed valve blade 26f'. Although the closed valve 26f is illustrated in the preferred embodiment as substantially completely blocking air from flowing through lower manifold runner 24f, it is understood that the valve geometry for a particular application may allow some air to pass through the runner even when the valve is completely closed.

The outlet end 32f' of the runner bypass 32f is positioned and shaped to induce a preferred motion to the air flow as it enters lower manifold runner 24f. In the preferred embodiment, the bypass outlet end is positioned close to one side of the respective lower manifold runner 24f preferably near the cylinder head mounting end 24f' thereof. As such, tumble is induced in the lower manifold runner 24f in a position very close to the respective cylinder head. As explained above, it is desirable to induce tumble or swirl as close to the cylinder head as possible.

Alternate embodiments may position the bypass outlet end closer to or even directly at the center of the runner so long as the intended and preferred motion to the air flow is induced. For example, charge motion may be induced simply by orienting the outlet end to direct air in a direction transverse to the longitudinal extent of the runner, regardless of radial position of the outlet within the runner.

The engine control system (not shown) operates actuator 30 to move shaft 28 and thus also charge motion control valves 26a-26f in accordance with engine load conditions. When the system determines a charge motion such as tumble or swirl is required, actuator 30 drives shaft 28 to close the charge motion control valves 26a-26f. As such, air is diverted through the bypasses 32a-32f in each lower manifold runner and motion such as tumble or swirl is induced to the charge. When the valves are open, air may continue to flow through the bypasses in addition to the lower manifold runners, however, this would not induce appreciable tumble or swirl since the air movement is not biased away from linearly following the longitudinal extent of the runner. If desired, another valve could be placed to close off the bypass during times when the charge motion control valve is open. The induced charge motion may of course be modified and fine-tuned to particular application requirements by changing the position and/or geometry of the bypass and/or respective runner. For example, various velocity and charge motion profiles can be designed through appropriate selection of bypass and manifold runner diameters and geometries. Such design selections and modifications are well within the abilities of those skilled in the art.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. Apparatus for controlling charge motion through an air intake manifold, said apparatus comprising:
   a) a plurality of air intake manifold runners each having an end adapted to be mounted to a cylinder head of an engine;
   b) a charge motion control valve positioned in each of said runners and movable between open and closed positions; and
   c) an air flow bypass positioned in a respective runner, said bypass having an inlet end adjacent said valve and an outlet end adjacent the cylinder mounting end thereof whereby air is directed through said bypass when said valve is in the closed position.

2. The apparatus of claim 1 wherein said air intake manifold runners are adapted to be mounted to a V-type engine.

3. The apparatus of claim 1 wherein said air intake manifold runners are adapted to be mounted to an in-line type engine.

4. Apparatus for controlling charge motion through an air intake manifold, comprising:
   a) a plurality of manifold runners, said manifold runners arranged in linear fashion at a first portion of said manifold and said runners extending in a non-linear fashion at a second portion of said manifold;
   b) a plurality of charge motion control valves positioned in said linearly arranged plurality of runners, respectively; and
   c) a drive shaft extending through said plurality of charge motion control valves and operable to alternately move said valves between open and closed positions, wherein when each of said plurality of charge motion control valves are in the closed position at least a portion of air is controllably permitted to flow past each of said plurality of charge motion control valves thereby causing charge motion.

5. The apparatus of claim 4 wherein said plurality of non-linearly arranged runners alternate branching away in different directions from said linearly arranged runners.

6. The apparatus of claim 5 wherein said non-linearly arranged runners branch to right and left positions adapted for mounting to the right and left cylinder head banks, respectively, of a "V" type engine.

7. Apparatus for controlling charge motion through an air intake manifold, comprising:
   a) a plurality of manifold runners, said manifold runners arranged in linear fashion at a first portion of said manifold and said runners extending in a non-linear fashion at a second portion of said manifold;
   b) a plurality of charge motion control valves positioned in said linearly arranged plurality of runners, respectively; and
   c) a drive shaft extending through said plurality of charge motion control valves and operable to alternately move said valves between open and closed positions, wherein said plurality of non-linearly arranged runners each include a runner bypass wherethrough air flow is directed when said valves are in said closed position.

8. The apparatus of claim 7 wherein each said runner bypass has an inlet end positioned radially outwardly of a respective said valve when in said closed position.

9. The apparatus of claim 8 wherein each said runner bypass has an outlet end positioned to direct air exiting said bypass to one side of a respective said manifold runner such that a charge motion is induced.

10. The apparatus of claim 9 wherein said non-linearly arranged runners each include an end adapted to be mounted to a respective cylinder head of an engine and wherein said bypass outlet end is positioned at or near the cylinder head mounting end of a respective manifold runner.

11. A method for controlling charge motion through an air intake manifold, comprising:
    a) providing a plurality of manifold runners, said manifold runners arranged in linear fashion at a first portion of said manifold and said runners extending in a non-linear fashion at a second portion of said manifold;
    b) providing a plurality of charge motion control valves positioned in said linearly arranged plurality of runners, respectively; and
    c) providing a drive shaft extending through said plurality of charge motion control valves and operable to alternately move said valves between open and closed positions, wherein when each of said plurality of charge motion control valves are in the closed position at least a portion of air is controllably permitted to flow past each of said plurality of charge motion control valves thereby causing charge motion.

12. A method for controlling charge motion through an air intake manifold, comprising:
    a) providing a plurality of manifold runners, said manifold runners arranged in linear fashion at a first portion of said manifold and said runners extending in a non-linear fashion at a second portion of said manifold;
    b) providing a plurality of charge motion control valves positioned in said linearly arranged plurality of runners, respectively; and
    c) providing a drive shaft extending through said plurality of charge motion control valves and operable to alternately move said valves between open and closed positions, wherein said plurality of non-linearly arranged runners each include a runner bypass wherethrough air flow is directed when said valves are in said closed position.

13. The method of claim 12 wherein each said runner bypass has an inlet end positioned radially outwardly of a respective said valve when in said closed position.

14. The method of claim 13 wherein each said runner bypass has an outlet end positioned to direct air exiting said bypass to one side of a respective said manifold runner such that a charge motion is induced.

15. The method of claim 14 wherein said non-linearly arranged runners each include an end adapted to be mounted to a respective cylinder head of an engine and wherein said bypass outlet end is positioned at or near the cylinder head mounting end of a respective manifold runner.

16. The method of claim 15 wherein said plurality of non-linearly arranged runners alternate branching away in different directions from said linearly arranged runners.

17. The method of claim 16 wherein said non-linearly arranged runners branch to right and left positions adapted for mounting to the right and left cylinder head banks, respectively, of a "V" type engine.

* * * * *